May 4, 1954    R. H. MUELLER ET AL    2,677,561
SEALING STRUCTURE
Original Filed Dec. 27, 1946

Inventors
ROBERT H. MUELLER
EARL E. CLINE

Cushman, Darby & Cushman
Attorneys

Patented May 4, 1954

2,677,561

UNITED STATES PATENT OFFICE 2,677,561

SEALING STRUCTURE

Robert H. Mueller, Decatur, Ill., and Earl E. Cline, Chattanooga, Tenn., assignors to Mueller Co., Decatur, Ill., a corporation of Illinois Original application December 27, 1946, Serial No. 718,752. Divided and this application November 12, 1948, Serial No. 59,482

6 Claims. (Cl. 286—7)

The present invention relates to sealing means of general utility for use in association with a member which enters an enclosure subject to the presence of fluid therein. This application is a division of our copending application, Serial No. 718,752, filed December 27, 1946, now U. S. Patent No. 2,576,631, issued November 27, 1951. The copending application discloses the bearing which is the subject of the present application in association with the movable shaft or stem of a fire hydrant valve, but it will be understood that the bearing is of more general utility as will be apparent from the specification.

It is an object of the invention to provide an improved packing arrangement for the valve stem and operating nut of a hydrant, consisting of packing elements of different characteristics cooperating with one another. This packing is substantially self-tightening in its action around the valve stem and its operating nut. The packing includes a resilient packing section of rubber or the like, which, while placed under compression in order that sealing energy may thereby be stored in the packing itself, is so protected by a sleeve or ferrule as to be substantially immune from tear or excessive wear by reason of contact with the moving valve stem, or parts associated therewith. The packing is so positioned and arranged in a chamber around the stem or other moving part that certain elements of the packing maintain a tight seal with the stem or the like, while other packing elements maintain a seal with the wall of the packing chamber. The construction is such that pressure entering the packing chamber tends to increase both of the sealing actions just referred to. In connection with the above, it will be understood that while we disclose preferred packing arrangements for these purposes, the packing arrangements disclosed have inherent advantages aside from the particular combinations in which they are disclosed. The bearings disclosed herein are used in association with a lubricant reservoir around the shaft which is being sealed off. The construction is such as will effectively preserve the lubricant in the reservoir packed off at top and bottom as described herein over a period of years without refilling, the particular packings and the double arrangement thereof preventing the forcing of the lubricant from its chamber, by the water which passes through the hydrant.

Figure 1:
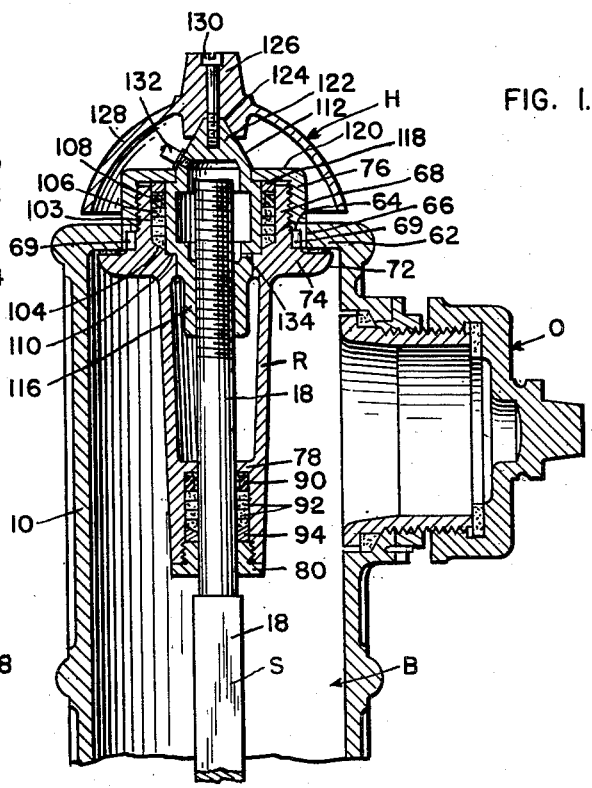
Figure 1 is a vertical sectional view through the top part of the fire hydrant showing the application of the invention to the valve operating shaft or stem of the hydrant.

In Figure 1, the substantially cylindrical hydrant barrel is shown at B, and it has a bonnet or hood H at its upper end. As is well-known in the art, the hydrant has a vertical valve operating stem S which operates a valve not shown in order to control the discharge of water from the side outlets or nozzles O.

The mechanism for operating the valve stem and at the same time providing for lubricating the working parts thereof will now be described.

The upper barrel section 10 has a circular top inwardly directed flange 62 with defining central opening 64 and has oppositely disposing guide notches 66. Into this opening an upwardly extending cylindrical section 68 of an oil reservoir member R is inserted. There are keys 69 carried on the oil reservoir member which enter the notches 66 to properly register the member and hold it against rotation.

In general, the oil reservoir member includes means to provide one or more seals around the valve stem or its operating nut, with a chamber comprising upper and lower sections to retain a lubricant around the working parts. The oil reservoir has an outwardly extending circular flange 72 positioned beneath the flange 62 of the barrel. A nut 76 is threaded onto the extending cylindrical portion 68 of the reservoir to engage the top of the flange 62, thus holding the assembled parts in the top of the hydrant barrel.

Figure 2:
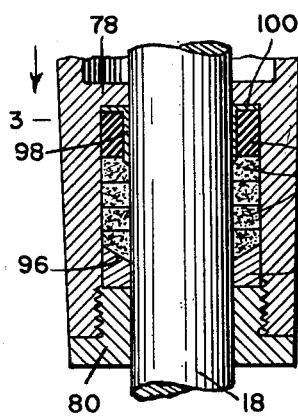
Figure 2 is a partial enlarged vertical sectional view of the bearing which seals off the lower part of the oil reservoir.
Figure 3:
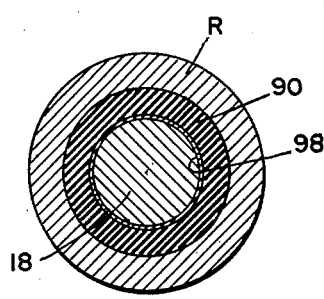
Figure 3 is a horizontal sectional view taken along the line 3—3 of Figure 2.

A lower end of the reservoir R provides a suitable recess for packing for the valve stem below its operating threads. The packing recess is defined by a smooth bore between an interior circular collar 78 which embraces a round portion of the shaft 18 in a non-binding manner, and a gland nut 80 which is threaded into the lower end of the reservoir. The gland nut is preferably made of non-ferrous metal. Between gland 80 and collar 78, there is an annular rubber washer 90 and several annular layers of compressible packing material made of flax, as shown at 92, there being a non-ferrous metal washer 94 beneath the flax layers which has an inwardly and downwardly tapered top wall 96 whereby, when the nut 80 is tightened, the pressure exerted on the flax layers is directed inwardly toward the valve stem. It will be understood that upon compressing the flax packing, a compression will be exerted upon the rubber washer 90, and this force is stored in the packing assembly and is constantly present to resist any pressure of the fluid acting upwardly from the interior of the barrel around the valve stem. As shown in Figure 2, there may be a ferrule liner 98 of such metal as brass, lining the interior of the rubber washer 90, and the top of this ferrule may be flanged outwardly as at 100 in order to provide end support for the washer 90 and keep it from tearing when the valve stem is moved vertically through the packing. Particularly, this ferrule will prevent the rubber 90 from being squeezed upwardly into the slight space between the valve stem and the inner face of the collar 78. The rubber sleeve 90 seals the outside wall of the packing recess against leakage, while the layers of flax 92 seal the valve stem against leakage.

When such a packing is in use, any pressure from below entering the packing chamber will pass outwardly of the flax rings 92 and will exert an inward pressure thereon which will tighten the seal against the stem. Similarly, this pressure acting upwardly on the rubber ring will have the effect of tightening its seal against the outer wall of the packing chamber. The soft rubber ring places an even resilient thrust on the flax, thus automatically taking up wear. The rubber ring keeps the packing tight by applying force in an axial direction, and this force acts in the flax inwardly toward the valve stem, particularly adjacent to the shoulder 96.

Figure 4:
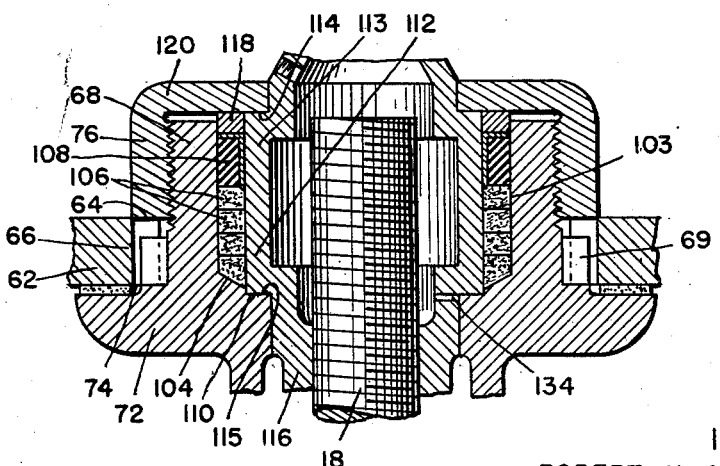
Figure 4 is a partial enlarged vertical sectional view through the upper part of the oil reservoir showing the upper bearing where it seals around the operating nut for the valve shaft or stem.

Turning again to Figure 1, the upper extension 68 of the reservoir is provided with an inside annular smooth bore 103 having a bottom tapered surface 104, and in this bore there are several circular layers of flax 106 in ring-like form and a circular rubber washer 108 as more clearly shown in Figure 4. Mounted on the annular ledge 110 upon the interior of the reservoir body below the taper 104, there is a valve stem operating nut 112, the outer wall of said nut being sealed by the packing means 106 and 108. The operating nut has an outwardly extending flange 113 limited by upper and lower shoulders 114 and 115 which respectively engage the nut 76 and the shoulder 110 to retain said nut against longitudinal movement while it is being turned to open and close the main valve. The interior of said nut is hollow, and it has a lower cylindrical threaded tube 116 which engages the conventional threads on the upper end 18 of the valve stem, so that upon turning said nut, the valve stem is caused to rise and fall in order to close and open the main valve of the hydrant. There is a non-ferrous metal ring 118 in the upper end of the packing recess, and it bears against the rubber washer 108 (Figure 4). This ring is pressed against the packing by tightening the securing nut 76, the top flange 120 of the latter serving to retain the operating nut and packing in position as shown. The head of the operating nut comprises a dome-like structure 122 square or otherwise polygonal in cross section and this portion fits within a socket 124 (likewise square in section) of the operating head or nut 126, the latter including the usual wrench portions and a skirt 128 which protects the whole assembly from the weather. The wrench head 126 may be bolted to the top of the operating nut 122 as by a bolt 130. There may be an "Alemite" fitting or similar device 132 fitted in the wall of the operating nut, in order to pump lubricant into the interior of the reservoir to lubricate all of the parts thereof, including the screw threads of the operating stem. Such a device would include a one-way valve to retain the lubricant in the reservoir. The ledge 110 between the reservoir member and the operating nut may likewise be lubricated by one or more radially extending passages 134 from the interior of the operating nut to the surface 110 which supports the flange of the reservoir member.

From the above, it will be apparent that I have provided an assembly in which a reservoir of oil or other lubricant is constantly retained around the upper operating end of a valve stem. The arrangement provides not only for lubrication of the valve stem where it passes into the reservoir member, but also where the operating nut turns within said member. Both of these packings are of compression storing type, and pressure exerted upwardly on the packing from the hydrant only serves to tighten the seal of the packing.

It will be understood that both of the packings described will operate in substantially the same manner. That is, upwardly exerted fluid pressure from the hydrant will act from around the outside of the flax packing to further tighten same against the valve stem, while the rubber packing will maintain a seal against the outer wall of the packing chamber. The compressed rubber will in itself tend to maintain the seal exerted by the flax rings against the stem. By reason of the double packing arrangement provided, at opposite ends of the reservoir, the hydrant pressure cannot displace the oil from the reservoir even if it should penetrate the lower seal, because of the presence of the upper seal, as described.

While I have disclosed the packing used for such as the rings 92 as being made of flax, it will be understood that other suitable compressible material could be used.

We claim:

1. Sealing means for a member which enters an enclosure subject to the presence of fluid under pressure, comprising a bearing equipped with a packing recess whose side wall is smooth and spaced from said member, said bearing comprising an annular resilient ring in said recess of rubber or the like capable of being compressed to store an expansible force therein, said resilient ring having a central opening to surround the member and being in contact with the side wall of said recess, a separate sleeve of soft metal comprising a continuous skirt which entirely lines the central opening of said resilient ring surrounding the member, at least one ring of non-resilient fibrous compressible packing material in said recess in contact with said resilient ring and with said member, said resilient ring being located in said recess at the low pressure end of the bearing with respect to the enclosure, and a packing follower adjustably mounted on the bearing for application of pressure to said packing longitudinally of said member to store expansible energy in said resilient ring whereby it will constantly exert force to compress said non-resilient packing material against said member.

2. A construction in accordance with claim 1, wherein said packer follower is mounted on the high pressure end of said bearing.

3. The structure defined in claim 1 in which the metal sleeve has an integral flange which extends outwardly toward the side wall of the recess to support that end of the rubber ring remote from the non-resilient packing material.

4. Sealing means for a member which enters an enclosure subject to the presence of fluid under pressure, comprising a bearing having a packing recess whose side wall is smooth and spaced from said member, said recess having end walls, one of which is movable longitudinally of said member by a gland adjustably mounted on the bearing, the end wall of said recess toward the pressure side of the bearing being tapered inwardly toward said member, at least one ring of flax packing in said recess bearing against said tapered end wall and snugly embracing said members an annular resilient ring of rubber or the like positioned between said flax ring and the opposite end wall of said recess and provided with an interior shield of soft metal surrounding said member, said resilient ring being capable of compression to store an expansible force therein, said ring of flax packing being positioned in said recess to permit fluid pressure from the enclosure to enter said recess outwardly of said flax packing to exert an inward force thereon for sealing engagement against said member, said resilient ring and said flax packing being compressed by said gland to expand said resilient ring outwardly to seal against the side wall of said recess and to store expansible energy in said resilient ring whereby it constantly exerts force to compress said flax packing against said member.

5. In apparatus of the character described, an enclosure for containing fluid under pressure therein, a shaft which enters said enclosure and which is mounted for movement therein, a bearing for said shaft attached to said enclosure and which surrounds said shaft at the point where it enters said enclosure, said bearing comprising a housing having a smooth inner side wall spaced from said shaft to provide a packing chamber surrounding said shaft, said housing having a fixed end wall and an opposed axially adjustable pressure applying end wall with openings therein whereby said shaft may pass through said chamber, and packing means within and filling said chamber around said shaft, said packing means comprising at least one ring of relatively non-resilient compressible fibrous packing material disposed against said end wall adjacent to the interior of said enclosure and a resilient ring of rubber or the like which fills the remainder of said chamber and disposed against said end wall remote from the interior of said enclosure, said rubber ring being of diameter to seal against the inner wall of said chamber and to store axially expanding force applied thereto by said adjustable end wall and to continuously apply such force to said non-resilient packing material to seal the latter against said shaft, the central bore and the end face of said rubber ring which is presented to said remote end wall being lined with a thin soft metal shield and said adjacent end wall being inclined to press said non-resilient packing inwardly toward said shaft providing for fluid under pressure from said enclosure to enter said chamber outwardly of said non-resilient packing and urge the latter inwardly toward said shaft.

6. A bearing comprising a metal housing surrounding a shaft having a smooth inner side wall spaced from the shaft to provide a packing chamber surrounding the shaft, said housing having a fixed end wall and an opposed axially adjustable pressure applying end wall with openings therein whereby the shaft may pass through said chamber, and packing means within and filling said chamber around the shaft, said packing means comprising at least one ring of relatively non-resilient compressible fibrous packing material against one of said end walls and a resilient ring of rubber or the like which fills the remainder of said chamber between said non-resilient packing ring and the opposite end wall of said chamber, said rubber ring being of diameter to seal against the inner wall of said chamber and to store pressure applied thereto by said adjustable end wall and to continuously exert pressure on said non-resilient packing material to seal the latter against said shaft, said end wall adjacent said non-resilient packing material being formed to taper inwardly toward the shaft to direct pressure applied to said non-resilient packing inwardly toward the shaft, said rubber ring being provided with a liner of thin, soft metal comprising an uninterrupted continuous skirt which extends throughout the entire length of said rubber ring to protect the latter against injury from movements of the shaft.

References Cited in the file of this patent

UNITED STATES PATENTS

| Number | Name | Date |
|---|---|---|
| 77,275 | Glanding | Apr. 28, 1868 |
| 210,868 | Martin | Dec. 17, 1878 |
| 242,133 | Jenkins | May 31, 1881 |
| 494,716 | Grimm | Apr. 4, 1893 |
| 1,595,401 | Humason | Aug. 10, 1926 |
| 1,679,324 | Murray | July 31, 1928 |
| 1,736,646 | Brammer | Nov. 19, 1929 |
| 2,310,558 | Teeters et al. | Feb. 9, 1943 |
| 2,388,710 | Sanford | Nov. 13, 1945 |

FOREIGN PATENTS

| Number | Country | Date |
|---|---|---|
| 260,347 | Great Britain | of 1926 |